US008816539B2

(12) United States Patent
Hermerding, II et al.

(10) Patent No.: US 8,816,539 B2
(45) Date of Patent: Aug. 26, 2014

(54) AC ADAPTOR MINIMIZATION THROUGH ACTIVE PLATFORM POWER CONSUMPTION MANAGEMENT

(75) Inventors: James G. Hermerding, II, San Jose, CA (US); Jorge P. Rodriguez, Portland, OR (US); Vasudevan Srinivasan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 12/827,656

(22) Filed: Jun. 30, 2010

(65) Prior Publication Data
US 2012/0001489 A1 Jan. 5, 2012

(51) Int. Cl.
G05F 3/06 (2006.01)
G06F 1/00 (2006.01)

(52) U.S. Cl.
USPC .......................................... 307/151; 713/300

(58) Field of Classification Search
USPC ........... 307/31, 150, 64, 66, 80, 151; 713/300
See application file for complete search history.

(56) References Cited

U.S. PATENT DOCUMENTS

| | | | |
|---|---|---|---|
| 6,925,573 B2 | 8/2005 | Bodas | |
| 7,558,798 B2 | 7/2009 | Nguyen | |
| 7,650,518 B2 | 1/2010 | Allarey et al. | |
| 2003/0126475 A1* | 7/2003 | Bodas | 713/300 |
| 2006/0277420 A1* | 12/2006 | Nguyen | 713/300 |
| 2007/0229024 A1 | 10/2007 | Li et al. | |
| 2008/0005592 A1* | 1/2008 | Allarey et al. | 713/300 |
| 2008/0122290 A1 | 5/2008 | Li et al. | |
| 2010/0064162 A1 | 3/2010 | Rotem et al. | |
| 2010/0115293 A1 | 5/2010 | Rotem et al. | |
| 2010/0264746 A1* | 10/2010 | Kazama et al. | 307/104 |
| 2010/0318306 A1* | 12/2010 | Tierney et al. | 702/62 |

FOREIGN PATENT DOCUMENTS

| | | | |
|---|---|---|---|
| CN | 101185047 | A | 5/2008 |
| JP | 2004133646 | A | 4/2004 |
| JP | 2004215413 | A | 7/2004 |
| JP | 2007299346 | A | 11/2007 |
| JP | 2010507869 | A | 3/2010 |
| JP | 2010518525 | A | 5/2010 |
| WO | 2008054618 | A2 | 5/2008 |
| WO | 2008098849 | A1 | 8/2008 |
| WO | 2012/003239 | A2 | 1/2012 |
| WO | 2012003239 | A3 | 4/2012 |

OTHER PUBLICATIONS

International Search Report and Written Opinion received for PCT application No. PCT/US2011/042449, mailed on Feb. 17, 2012. 10 Pages.

(Continued)

Primary Examiner — John Breene
Assistant Examiner — Manuel Rivera Vargas
(74) Attorney, Agent, or Firm — Jordan IP Law, LLC

(57) ABSTRACT

Systems and methods of managing platform power consumption may involve determining a power consumption level of a platform based on at least in part a current supplied by an AC adaptor. A power limit of an integrated circuit in the platform can be determined based on at least in part the power consumption level of the platform, wherein the power level may be applied to the integrated circuit.

17 Claims, 2 Drawing Sheets

(56) References Cited

OTHER PUBLICATIONS

International Preliminary Report on Patentability received for PCT application No. PCT/US2011/042449, mailed on Jan. 8, 2013, 6 pages.

Office Action received for United Kingdom Patent Application No. 1221611.5, mailed on Jan. 25, 2013, 1 page.

Office Action received for Japanese Patent Application No. 2013-512072, mailed on Nov. 12, 2013, 3 pages of Office Action and 4 Pages of English Translation.

Office Action received for Chinese Patent Application No. 201180002729.7, mailed on Jan. 30, 2014, 29 pages of Office Action Including 16 pages of English Translation.

* cited by examiner

AC ADAPTOR MINIMIZATION THROUGH ACTIVE PLATFORM POWER CONSUMPTION MANAGEMENT

BACKGROUND

1. Technical Field

Embodiments generally relate to power management. More particularly, embodiments relate to alternating current (AC) adaptor minimization through active platform power consumption management.

2. Discussion

In order to support a greater number and wider variety of applications, mobile platforms may have increasingly robust circuitry. For example, certain designs may provide for a mode in which the CPU (central processing unit) of the mobile platform is permitted to operate for short periods above its maximum rated voltage and frequency. In such a case, the total platform power could exceed the capacity of the AC adaptor that supplies current to the platform. While a higher power adaptor might be used to protect against such over current conditions, this approach may result in a physically larger and more expensive adaptor. Indeed, if a 65 W rated adaptor operates at power levels greater than 65 W for durations on the order of seconds, the cost of the adaptor could be the same as a 90 W rated adaptor. Moreover, excessive power consumption could still occur even with the use of a higher rated adaptor.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for a method of managing platform power consumption in which a power consumption level of a platform is determined based on at least in part power supplied by an input power supply. A power limit of an integrated circuit in the platform can be determined based on at least in part the power consumption level of the platform. The method may also provide for applying the power limit to the integrated circuit.

Embodiments can also include an apparatus including first logic to determine a power consumption level of a platform based on at least in part power to be supplied by an input power supply. The apparatus may include second logic to determine a power limit of an integrated circuit in the platform based on at least in part the power consumption level of the platform, and third logic to apply the power limit to the integrated circuit.

Other embodiments may provide for a system having an input power supply and a mobile platform to receive and measure power to be supplied by the input power supply. The mobile platform can have an embedded controller, an integrated circuit, and a system charger coupled to the input power supply. The embedded controller may have first logic to determine a power consumption level of the platform based on at least in part power to be supplied by the input power supply. In addition, the embedded controller can have second logic to determine a power limit of the integrated circuit based on at least in part the power consumption level of the platform, and third logic to apply the power limit to the integrated circuit.

Figure 1:
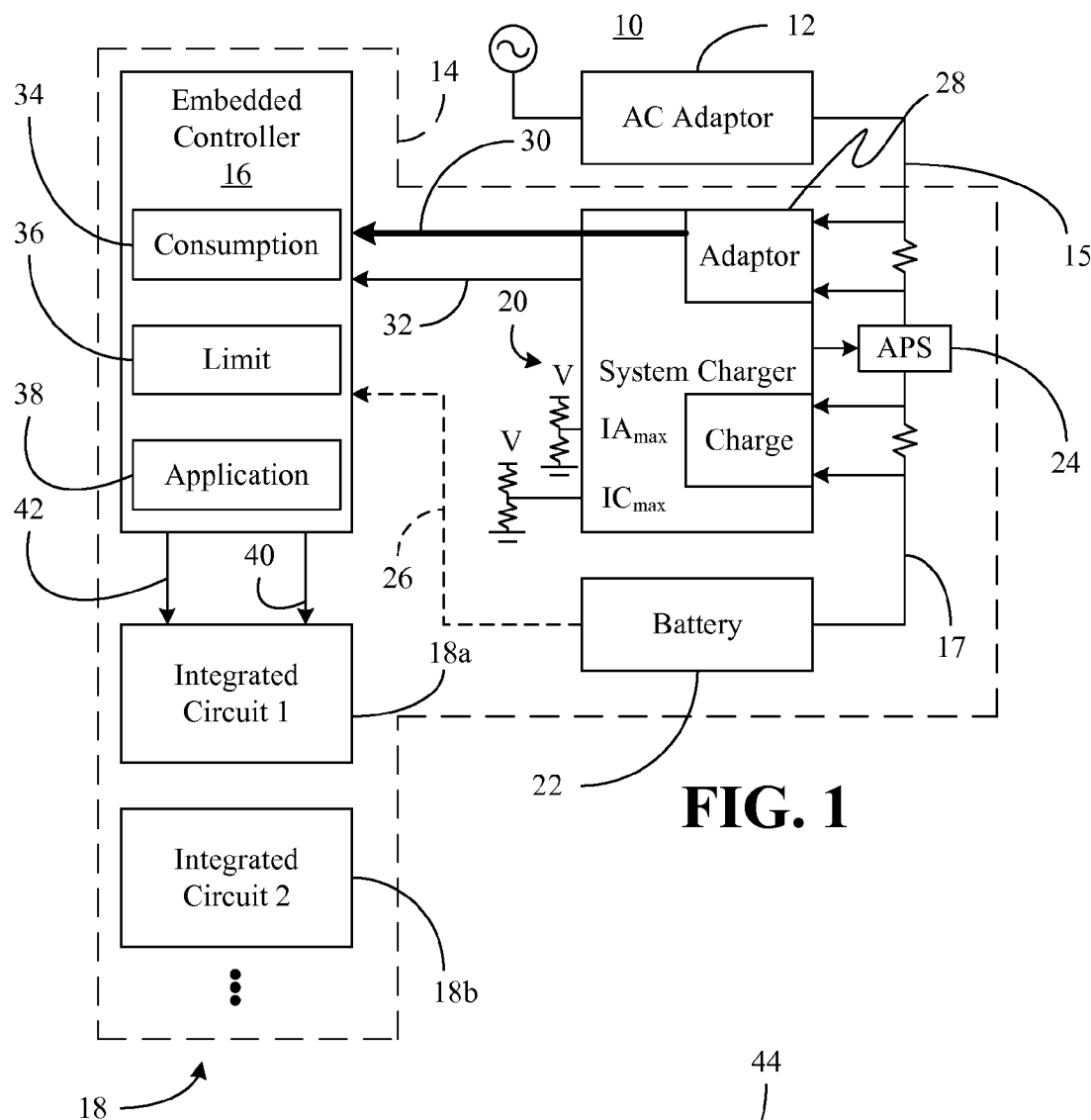
FIG. 1 is a block diagram of an example of a system according to an embodiment.

Turning now to FIG. 1, a computing system 10 having an alternating current (AC) adaptor (e.g., "brick", or other input power supply) 12 and a platform 14 is shown. The platform 14 could be part of a mobile device such as a laptop, personal digital assistant (PDA), mobile Internet device (MID), wireless smart phone, media player, imaging device, etc., or any combination thereof. The system could alternatively include a fixed platform such as a desktop personal computer (PC) or a server. The illustrated AC adaptor 12 receives an AC current input and supplies a direct current (DC) operating signal (e.g., 18-19 V) on line 15 to the platform 14, which includes an embedded controller 16, a plurality of integrated circuits (ICs) 18 (18a, 18b), a system charger (e.g., discrete analog circuitry) 20, and a battery (e.g., Li-ion, fuel cell, etc.). Thus, the system charger 20 can receive the current supplied by the AC adaptor 12 and use an analog power switch (APS) 24 to provide a charging current on line 17 the battery 22, which may provide a smart battery signal 26 to an interface (e.g., SMBus Host Interface, Smart Battery System Manager Specification, Rev. 1.1, Dec. 15, 1998, SBS Implementer's Forum) of the embedded controller 16.

The illustrated system charger 20 includes an adaptor module 28 to determine the current supplied by the AC adaptor 12 to the platform 14, and identify the determined current level to the embedded controller 16 via an adaptor current signal 30. Alternatively, the embedded controller 16 could use a separate current detection circuit to sense the current supplied by the AC adaptor 12 to the platform 14. The system charger 20 may also transmit an adaptor presence signal 32 to the embedded controller 16 in order to indicate whether the AC adaptor 12 is connected to the platform 14 and operating properly. The current supplied by the AC adaptor 12 may be a function of the operation of the plurality of integrated circuits 18, wherein the integrated circuits 18 could include a variety of platform components such as a single-core processor, a multi-core processor, a network controller, a discrete graphics controller, a memory controller, and so on.

For example, a first integrated circuit 18a might include a multi-core processor capable of entering a "boost" mode in which one or more cores of the processor operate at speeds above maximum rated voltage and frequency. A second integrated circuit 18b, on the other hand, could include a network controller that provides off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes.

The embedded controller 16 can include consumption logic 34 to determine the power consumption level of the platform 14 based on the current supplied by the AC adaptor 12, and limit logic 36 to calculate a power limit of one or more of the integrated circuits 18 based on the power consumption level of the platform 14. As will be discussed in greater detail, the calculation of the power limit may involve determining the difference between the power consumption level of the platform 14 and the maximum power level associated with the AC adaptor 12 (e.g., maximum rated power). In the illustrated example, the embedded controller 16 calculates a power limit for the first integrated circuit 18*a* and uses application logic 38 to apply the calculated power limit to the first integrated circuit 18*a*.

In one example, the calculated power limit is greater than the thermal design power (TDP) level associated with the first integrated circuit 18*a*. In such a case, the application logic 38 could use a program signal 40 to program the first integrated circuit 18*a* with the power limit, wherein the first integrated circuit 18*a* operates at a frequency and voltage that is greater than the frequency and voltage associated with the TDP level of the first integrated circuit 18*a*. By permitting the first integrated circuit 18*a* to operate at a higher performance level, the platform 14 can experience greater overall performance, even if the time period for such operation is relatively short. Moreover, actively limiting the power of the first integrated circuit 18*a* based on the amount of power available from the AC adaptor 12 reduces the likelihood of an over current condition and enables the use of a smaller and less expensive AC adaptor 12.

In another example, the power consumption level of the platform 14 could exceed the maximum power rating of the AC adaptor 12. In this case, the calculated power limit may be less than the TDP level associated with the first integrated circuit 18*a* and the application logic 38 might use a throttling signal 42 to drive the first integrated circuit 18*a* into a low power mode such as an ACPI (Advanced Configuration and Power Interface Specification, ACPI Specification, Rev. 4.0, Jun. 16, 2009) low power state. Thus, the illustrated embedded controller 16 either increases or decreases the power budget available to the first integrated circuit 18*a* based on the amount of available platform power as dictated by the power constraints of the AC adaptor 12. The power limit calculation and application processes could be used for other integrated circuits 18 and/or components of the platform 14.

Figure 2:
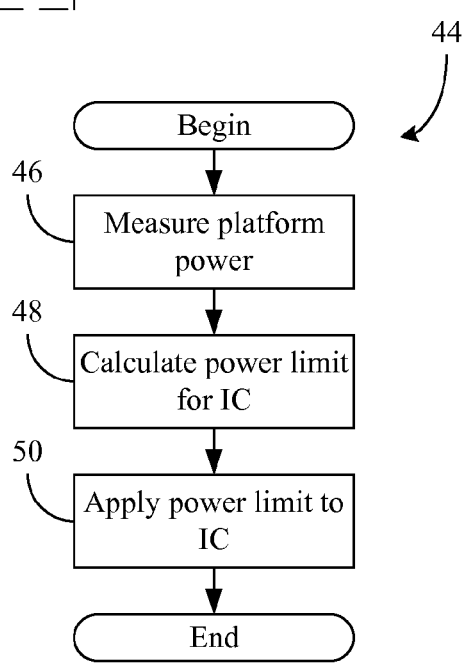
FIG. 2 is a flowchart of an example of a method of managing platform power consumption according to an embodiment.

Turning now to FIG. 2, a method 44 of managing platform power consumption is shown. The method 44 may be implemented in fixed-functionality hardware using circuit technology such as application specific integrated circuit (ASIC), complementary metal oxide semiconductor (CMOS) or transistor-transistor logic (TTL) technology, in executable firmware as a set of logic instructions stored in a machine- or computer-readable medium of a memory such as random access memory (RAM), read only memory (ROM), programmable ROM (PROM), flash memory, etc., or any combination thereof. Processing block 46 provides for measuring a power consumption level of a platform based on power supplied by an input power supply. As already noted, the power consumption level can be measured with circuitry resident on the platform. For example, an embedded controller might include an analog to digital (A/D) converter and a battery charger pin that receives an analog voltage signal that is proportional to the current/power from the input power supply. Alternatively, the A/D converter could reside in the battery charger, or separate analog circuitry could be used to measure the input current/power. A power limit of an integrated circuit in the platform can be calculated at block 48 based on the power consumption level of the platform. Illustrated block 50 provides for applying the calculated power limit to the integrated circuit.

Figure 3A:
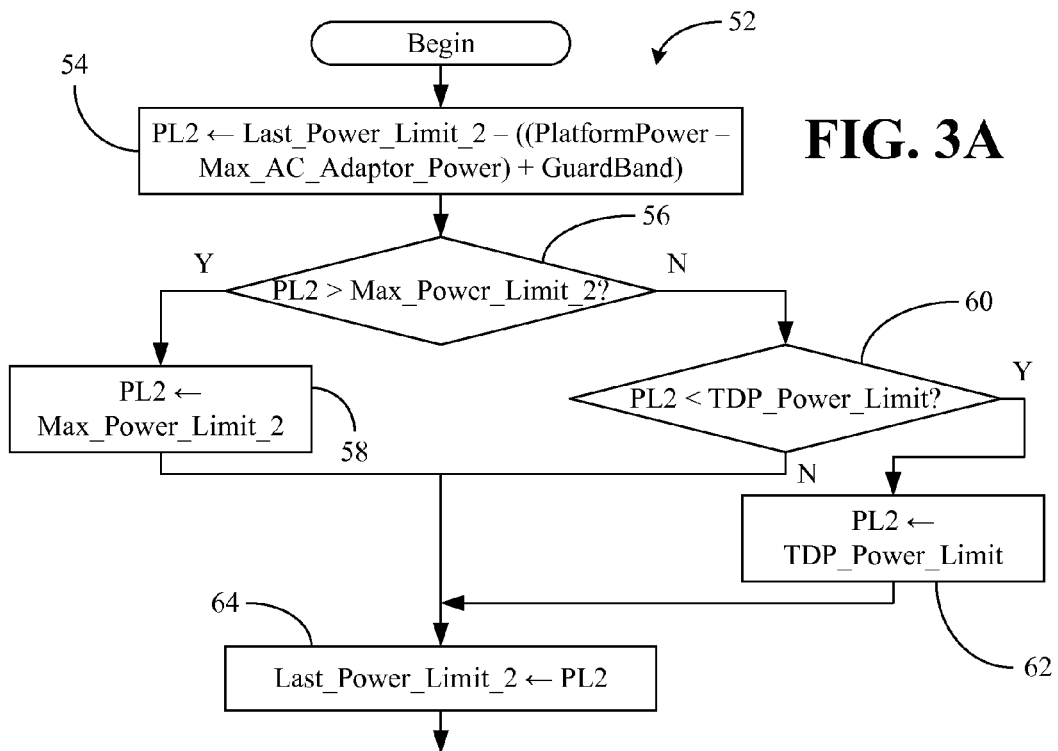
FIGS. 3A and 3B are flowcharts of examples of methods of calculating power limits for integrated circuits according to embodiments.

FIG. 3A shows one process 52 for calculating a power limit for an integrated circuit. The process 52 may be readily substituted for the processing block 48 (FIG. 2), already discussed. In the illustrated example, block 54 provides for calculating a power limit ("PL2", wherein the "2" is used to designate parameter values other than the TDP level) based on the most recent power limit for the integrated circuit ("Last_Power_Limit_2"), the power consumption level of the platform ("PlatformPower"), the maximum power level associated with the adaptor ("Max_AC_Adaptor_Power"), and a protective guard band ("GuardBand"). In particular, the difference between the platform power level and the adaptor maximum power level is calculated, wherein the difference may generally represent the amount of available platform power. In the illustrated example, the difference (adjusted by the guard band value) is added (as long as the platform power consumption level is less than the maximum power level associated with the adaptor plus the guard band value—otherwise, the adjusted difference is subtracted) to the most recent power limit for the integrated circuit to obtain the new power limit. Thus, the power limit of the integrated circuit may be dynamically increased so that the integrated circuit is permitted to use a maximum amount of the available platform power.

Block 56 provides for determining whether the calculated power limit is greater than the maximum allowed value for the power limit ("Max_Power_Limit_2"). If so, the power limit for the integrated circuit is set to the maximum allowed value for the power limit at block 58. Otherwise, a determination may be made at block 60 as to whether the calculated power limit is below the TDP level ("TDP_Power_Limit") for the integrated circuit. If so, illustrated block 62 provides for setting the power limit for the integrated circuit to TDP level. Blocks 56, 58, 60 and 62 therefore provide for bounding the power limit by a maximum value at the upper end and by the TDP level at the lower end. Block 62 might also and/or alternatively involve driving the integrated circuit into a low power mode with a throttling signal 42 (FIG. 1), as already discussed. The most recent power limit for the integrated circuit may be set as the calculated power limit at block 64.

Figure 3B:
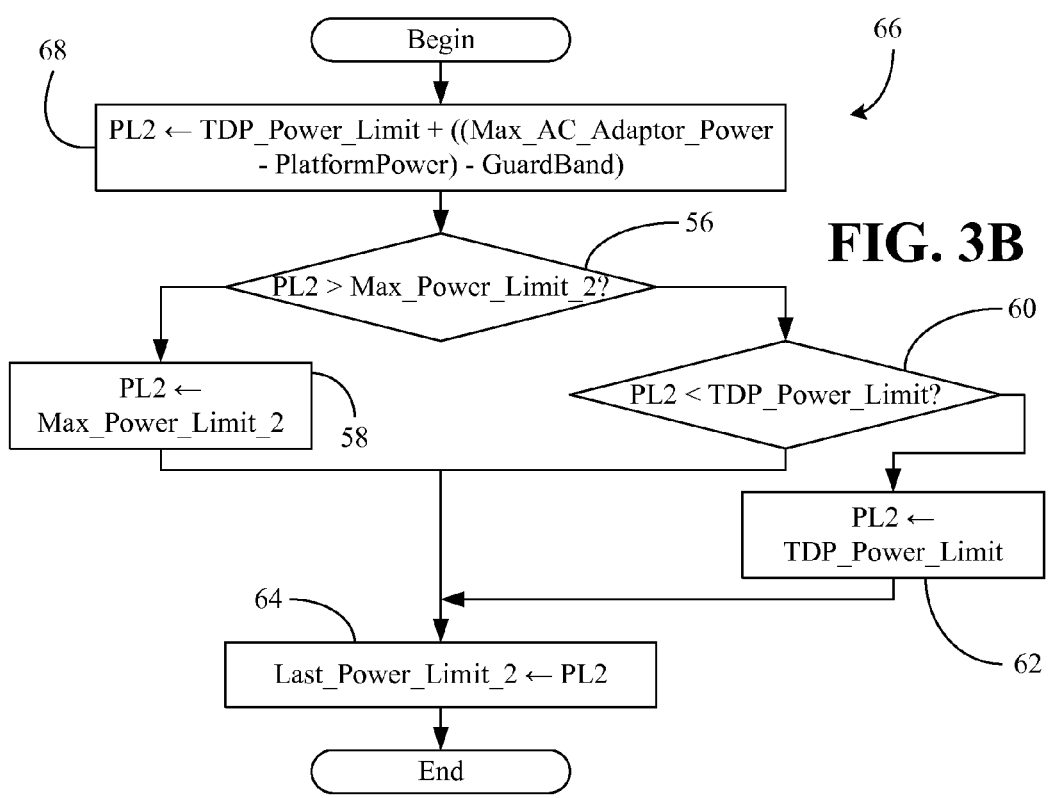

Turning now to FIG. 3B, a more conservative process 66 of calculating a power limit for an integrated circuit is shown. The process 66 may be readily substituted for the processing block 48 (FIG. 2), already discussed. In the illustrated example, block 68 provides for calculating a power limit based on the TDP level, the power consumption level of the platform, the maximum power level associated with the adaptor, and a protective guard band. In particular, the difference between the platform power level and the adaptor maximum power level is calculated, wherein the difference may generally represent the amount of available platform power. In the illustrated example, the difference (adjusted by the guard band value) is added (as long as the platform power consumption level is less than the maximum power level associated with the adaptor, adjusted by the guard band value) to the TDP level to obtain the new power limit. Thus, the power limit of the integrated circuit may be dynamically increased above the TDP level of the integrated circuit. Blocks 56, 58, 60 and 62 provide for bounding the power limit by a maximum value at the upper end and by the TDP level at the lower end, as already discussed.

The techniques described herein therefore enable the use of AC adaptors with relatively low power ratings to supply mobile platforms having components with functional profiles that permit operating points above the TDP of the components in question. Smaller and less expensive AC adaptors may be particularly advantageous in mobile computing environments where size, weight and cost can be even more relevant.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, systems on chip (SoCs), SSD/NAND controller ASICs, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising:
   logic, implemented at least partly in fixed-functionality hardware, to,
   determine a power consumption level of a platform based on at least in part power to be supplied by an input power supply;
   determine a power limit of an integrated circuit in the platform based on at least in part the power consumption level of the platform;
   apply the power limit to the integrated circuit; and
   drive the integrated circuit into a low performance state if the power limit of the integrated circuit is less than a thermal design power level associated with the integrated circuit.

2. The apparatus of claim 1, wherein the power limit is to be greater than a thermal design power level associated with the integrated circuit and the integrated circuit is to operate at a frequency greater than a frequency associated with the thermal design power level.

3. The apparatus of claim 2, wherein the logic is to program the integrated circuit with the power limit.

4. The apparatus of claim 1, wherein the input power supply is to include an adaptor and the integrated circuit is to include at least one of a single-core processor, a multi-core processor, a network controller, a graphics controller and a memory controller.

5. The apparatus of claim 1, wherein the logic is to determine a difference between the power consumption level of the platform and a maximum power level associated with the input power supply.

6. The apparatus of claim 1, wherein the logic is to obtain an identification of a current supplied by the input power supply to the integrated circuit from a platform charger coupled to the input power supply.

7. The apparatus of claim 1, further including a current detection circuit to sense a current supplied by the input power supply to the platform.

8. A method comprising:
   determining, using an embedded controller, a power consumption level of a platform based on at least in part power supplied by an input power supply;
   determining a power limit of an integrated circuit in the platform based on at least in part the power consumption level of the platform;
   applying the power limit to the integrated circuit; and
   driving the integrated circuit into a low performance state if the power limit of the integrated circuit is less than a thermal design power level associated with the integrated circuit.

9. The method of claim 8, wherein the power limit is greater than a thermal design power level associated with the integrated circuit and the integrated circuit operates at a frequency greater than a frequency associated with the thermal design power level.

10. The method of claim 9, wherein applying the power limit to the integrated circuit includes programming the integrated circuit with the power limit.

11. The method of claim 8, wherein the input power supply includes an adaptor and the integrated circuit includes at least one of a single-core processor, a multi-core processor, a network controller, a graphics controller and a memory controller.

12. The method of claim 8, wherein calculating the power limit includes determining a difference between the power consumption level of the platform and a maximum power level associated with the input power supply.

13. The method of claim 8, wherein determining the power consumption level of the platform includes obtaining an identification of a current supplied by the input power supply to the integrated circuit from a platform charger coupled to the input power supply.

14. The method of claim 8, wherein determining the power consumption level of the platform includes sensing a current supplied by the input power supply to the platform.

15. A system comprising:
an input power supply; and
a mobile platform to receive and measure power to be supplied by the input power supply, the mobile platform including an embedded controller, an integrated circuit and a system charger coupled to the input power supply, the embedded controller having logic, implemented at least partly in fixed-functionality hardware, to,
determine a power consumption level of the platform based on at least in part the power to be supplied by the input power supply,
determine a power limit of the integrated circuit based on at least in part the power consumption level of the,
apply the power limit to the integrated circuit, and
drive the integrated circuit into a low performance state if the power limit of the integrated circuit is less than a thermal design power level associated with the integrated circuit.

16. The system of claim 15, wherein the power limit is to be greater than a thermal design power level associated with the integrated circuit, the logic is to program the integrated circuit with the power limit, and the integrated circuit is to operate at a frequency greater than a frequency associated with the thermal design power level.

17. The system of claim 15, wherein the input power supply includes an adaptor and the integrated circuit includes at least one of a single-core processor, a multi-core processor, a network controller, a graphics controller and a memory controller.

* * * * *